(12) United States Patent
Scheinert (10) Patent No.: US 7,848,770 B2
(45) Date of Patent: Dec. 7, 2010

(54) DISTRIBUTED ANTENNA COMMUNICATIONS SYSTEM AND METHODS OF IMPLEMENTING THEREOF

(75) Inventor: Stefan Scheinert, San Jose, CA (US)

(73) Assignee: LGC Wireless, Inc., San Jose, CA (US)

( * ) Notice: Subject to any disclaimer, the term of this patent is extended or adjusted under 35 U.S.C. 154(b) by 608 days.

(21) Appl. No.: 11/511,646

(22) Filed: Aug. 29, 2006

(65) Prior Publication Data

US 2008/0058018 A1    Mar. 6, 2008

(51) Int. Cl.
*H04B 7/00* (2006.01)
*H04B 1/38* (2006.01)
*H04M 1/00* (2006.01)

(52) U.S. Cl. .................... 455/524; 455/525; 455/562.1; 455/560

(58) Field of Classification Search .............. 455/426.1, 455/426.2, 464, 465, 524, 525, 11.1, 7, 16, 455/500, 67.11, 562.1; 370/315, 342, 350
See application file for complete search history.

(56) References Cited

U.S. PATENT DOCUMENTS

| | | |
|---|---|---|
| 3,866,121 A | 2/1975 | Nakamura et al. |
| 4,183,054 A | 1/1980 | Patisaul et al. |
| 4,451,916 A | 5/1984 | Casper et al. |
| 4,611,323 A | 9/1986 | Hessenmiiller |
| 4,628,501 A | 12/1986 | Loscoe |
| 4,654,843 A | 3/1987 | Roza et al. |
| 4,667,319 A | 5/1987 | Chum |
| 4,691,292 A | 9/1987 | Rothweiler |
| 4,760,573 A | 7/1988 | Calvignac et al. |
| 4,789,993 A | 12/1988 | Ryu |
| 5,193,109 A | 3/1993 | Chien-Yeh Lee |
| 5,212,831 A | 5/1993 | Chuang et al. |
| 5,243,598 A | 9/1993 | Lee |
| 5,280,472 A * | 1/1994 | Gilhousen et al. ........... 370/335 |

(Continued)

FOREIGN PATENT DOCUMENTS

DE    3707244 A    9/1988

(Continued)

OTHER PUBLICATIONS

B. Schweber, Maintaining cellular connectivity indoors demands sophisticated design, EDN Magazine, Dec. 21, 2000.

(Continued)

*Primary Examiner*—Tilahun Gesesse
(74) *Attorney, Agent, or Firm*—Fogg & Powers LLC (57) ABSTRACT

The present invention provides a distributed antenna communications system and methods of implementing a distributed antenna communications system. In accordance with an embodiment of the invention, a distributed antenna system comprises: a base station configured for communication with a telecommunications network; a multi-port repeater hub connected to the base station to receive a communications signal from the base station and to distribute the communications signal to a plurality of ports of the multi-port repeater hub, the multi-port repeater hub comprising a scanner for scanning a plurality of frequency channels to identify one or more channels of the communications signal received from the base station; and a plurality of antenna units, each coupled to one of the ports of the multi-port repeater hub.

35 Claims, 4 Drawing Sheets

U.S. PATENT DOCUMENTS

| | | |
|---|---|---|
| 5,303,287 A | 4/1994 | Laborde |
| 5,321,736 A | 6/1994 | Beasley |
| 5,321,849 A | 6/1994 | Lemson |
| 5,339,184 A | 8/1994 | Tang |
| 5,351,146 A * | 9/1994 | Chan et al. ............. 398/58 |
| 5,381,459 A | 1/1995 | Lappington |
| 5,390,366 A * | 2/1995 | Kasugai ............. 455/524 |
| 5,400,391 A | 3/1995 | Emura et al. |
| 5,461,627 A | 10/1995 | Rypinski |
| 5,519,691 A | 5/1996 | Darcie et al. |
| 5,545,397 A | 8/1996 | Spielvogel et al. |
| 5,563,606 A | 10/1996 | Wang |
| 5,566,168 A | 10/1996 | Dent |
| 5,603,080 A * | 2/1997 | Kallander et al. ............. 455/14 |
| 5,621,786 A | 4/1997 | Fischer et al. |
| 5,627,879 A | 5/1997 | Russell et al. |
| 5,631,916 A | 5/1997 | Georges et al. |
| 5,642,405 A | 6/1997 | Fischer et al. |
| 5,644,622 A | 7/1997 | Russell et al. |
| 5,657,374 A | 8/1997 | Russell et al. |
| 5,668,562 A | 9/1997 | Cutrer et al. |
| 5,682,256 A | 10/1997 | Motley et al. |
| 5,701,583 A | 12/1997 | Harbin et al. |
| 5,708,961 A | 1/1998 | Hylton et al. |
| 5,732,076 A | 3/1998 | Ketseoglou et al. |
| 5,761,619 A | 6/1998 | Danne et al. |
| 5,765,097 A | 6/1998 | Dail |
| 5,765,099 A | 6/1998 | Georges et al. |
| 5,774,789 A | 6/1998 | Van der Kaay et al. |
| 5,781,541 A | 7/1998 | Schneider |
| 5,781,859 A | 7/1998 | Beasley |
| 5,787,344 A | 7/1998 | Scheinert |
| 5,802,173 A * | 9/1998 | Hamilton-Piercy et al. . 379/56.2 |
| 5,805,983 A | 9/1998 | Naidu et al. |
| 5,809,395 A | 9/1998 | Hamilton-Piercy et al. |
| 5,809,419 A | 9/1998 | Schellinger et al. |
| 5,809,422 A | 9/1998 | Raleigh et al. |
| 5,815,538 A | 9/1998 | Grell et al. |
| 5,822,324 A | 10/1998 | Kostresti et al. |
| 5,833,493 A | 11/1998 | Hung |
| 5,852,651 A | 12/1998 | Fischer et al. |
| 5,875,179 A * | 2/1999 | Tikalsky ............. 370/315 |
| 5,878,325 A | 3/1999 | Dail |
| 5,883,882 A | 3/1999 | Schwartz |
| 5,887,261 A | 3/1999 | Csapo et al. |
| 5,903,834 A * | 5/1999 | Wallstedt et al. ......... 455/422.1 |
| 5,907,544 A | 5/1999 | Rypinski |
| 5,912,641 A | 6/1999 | Dietrich |
| 5,930,682 A | 7/1999 | Schwartz et al. |
| 5,946,622 A | 8/1999 | Bojeryd |
| 5,969,837 A | 10/1999 | Farber et al. |
| 5,983,070 A | 11/1999 | Georges et al. |
| 5,987,014 A | 11/1999 | Magill et al. |
| 6,005,884 A * | 12/1999 | Cook et al. ............. 375/132 |
| 6,014,546 A | 1/2000 | Georges et al. |
| 6,034,950 A | 3/2000 | Sauer et al. |
| 6,078,812 A | 6/2000 | Mintz |
| 6,108,113 A | 8/2000 | Fee |
| 6,108,550 A * | 8/2000 | Wiorek et al. ............. 455/447 |
| 6,108,626 A | 8/2000 | Cellario et al. |
| 6,112,086 A | 8/2000 | Wala |
| 6,125,260 A | 9/2000 | Wiedeman et al. |
| 6,128,496 A | 10/2000 | Scheinert |
| 6,141,533 A | 10/2000 | Wilson et al. |
| 6,147,786 A | 11/2000 | Pan |
| 6,157,659 A | 12/2000 | Bird |
| 6,157,810 A | 12/2000 | Georges et al. |
| 6,181,687 B1 | 1/2001 | Bisdikian |
| 6,188,693 B1 | 2/2001 | Murakami |
| 6,192,216 B1 | 2/2001 | Sabat, Jr. et al. |
| 6,195,342 B1 | 2/2001 | Rohani |
| 6,198,558 B1 | 3/2001 | Graves et al. |
| 6,222,660 B1 | 4/2001 | Traa |
| 6,226,274 B1 | 5/2001 | Reese et al. |
| 6,236,365 B1 | 5/2001 | LeBlanc et al. |
| 6,249,252 B1 | 6/2001 | Dupray |
| 6,262,981 B1 | 7/2001 | Schmutz |
| 6,275,990 B1 | 8/2001 | Dapper et al. |
| 6,285,881 B1 | 9/2001 | Huang |
| 6,317,884 B1 | 11/2001 | Eames et al. |
| 6,337,754 B1 | 1/2002 | Imajo |
| 6,353,600 B1 | 3/2002 | Schwartz et al. |
| 6,362,908 B1 | 3/2002 | Kimbrough et al. |
| 6,373,887 B1 | 4/2002 | Aiyagari et al. |
| 6,374,124 B1 | 4/2002 | Slabinski |
| 6,377,640 B2 | 4/2002 | Trans |
| 6,421,009 B2 | 7/2002 | Suprunov |
| RE37,820 E | 8/2002 | Scheinert |
| 6,459,900 B1 | 10/2002 | Scheinert |
| 6,466,572 B1 | 10/2002 | Ethridge et al. |
| 6,466,766 B1 | 10/2002 | Treatch |
| 6,480,551 B1 | 11/2002 | Ohishi et al. |
| 6,484,012 B1 | 11/2002 | Nche et al. |
| 6,486,907 B1 | 11/2002 | Farber et al. |
| 6,498,936 B1 | 12/2002 | Raith |
| 6,542,754 B1 * | 4/2003 | Sayers et al. ............. 455/502 |
| 6,556,551 B1 | 4/2003 | Schwartz |
| 6,567,473 B1 | 5/2003 | Tzannes |
| 6,574,472 B1 | 6/2003 | Scheinert |
| 6,584,084 B1 * | 6/2003 | Barany et al. ............. 370/329 |
| 6,594,496 B2 | 7/2003 | Schwarz |
| 6,625,427 B1 | 9/2003 | Kayano et al. |
| 6,667,973 B1 | 12/2003 | Gorshe et al. |
| 6,674,966 B1 | 1/2004 | Koonen |
| 6,684,058 B1 | 1/2004 | Karacaoglu et al. |
| 6,697,603 B1 | 2/2004 | Lovinggood et al. |
| 6,704,545 B1 | 3/2004 | Wala |
| 6,729,929 B1 | 5/2004 | Sayers et al. |
| 6,738,597 B1 * | 5/2004 | Jeung et al. ............. 455/11.1 |
| 6,768,745 B1 | 7/2004 | Gorshe et al. |
| 6,771,933 B1 | 8/2004 | Eng et al. |
| 6,778,835 B2 * | 8/2004 | You et al. ............. 455/455 |
| 6,785,558 B1 | 8/2004 | Stratford et al. |
| 6,801,767 B1 | 10/2004 | Schwartz et al. |
| 6,826,163 B2 | 11/2004 | Mani et al. |
| 6,826,164 B2 | 11/2004 | Mani et al. |
| 6,831,901 B2 | 12/2004 | Millar |
| 6,865,390 B2 | 3/2005 | Goss et al. |
| 6,907,048 B1 | 6/2005 | Treadaway et al. |
| 6,917,614 B1 | 7/2005 | Laubach et al. |
| 6,952,181 B2 | 10/2005 | Karr et al. |
| 6,963,305 B2 | 11/2005 | Knapp |
| 6,967,966 B1 | 11/2005 | Donohue |
| 7,014,500 B2 | 3/2006 | Belesimo |
| 7,016,308 B1 | 3/2006 | Gallagher |
| 7,035,671 B2 | 4/2006 | Solum |
| 7,050,786 B2 | 5/2006 | Caci |
| 7,103,279 B1 | 9/2006 | Koh et al. |
| 7,127,175 B2 | 10/2006 | Mani et al. |
| 7,136,624 B2 | 11/2006 | Ofuji et al. |
| 7,151,940 B2 | 12/2006 | Diao et al. |
| 7,205,864 B2 | 4/2007 | Schultz, Jr. et al. |
| 7,215,651 B2 | 5/2007 | Millar |
| 7,236,470 B1 * | 6/2007 | Bims ............. 370/328 |
| 7,289,972 B2 | 10/2007 | Rieser et al. |
| 7,313,415 B2 | 12/2007 | Wake et al. |
| 7,321,787 B2 * | 1/2008 | Kim ............. 455/574 |
| 7,496,295 B2 * | 2/2009 | Baldine et al. ............. 398/69 |
| 7,526,203 B2 * | 4/2009 | Tamil ............. 398/54 |
| 7,564,840 B2 * | 7/2009 | Elliott et al. ............. 370/356 |
| 7,676,156 B2 * | 3/2010 | Wellen ............. 398/69 |
| 7,689,120 B2 * | 3/2010 | Hoang et al. ............. 398/57 |
| 2002/0037054 A1 * | 3/2002 | Schurig ............. 375/257 |
| 2002/0049061 A1 | 4/2002 | Pinola |

| | | |
|---|---|---|
| 2002/0072329 A1 | 6/2002 | Bandeira et al. |
| 2002/0089958 A1 | 7/2002 | Feder et al. |
| 2002/0128009 A1 | 9/2002 | Boch et al. |
| 2002/0167954 A1 | 11/2002 | Highsmith et al. |
| 2002/0191565 A1 | 12/2002 | Mani et al. |
| 2003/0008669 A1 | 1/2003 | Stein et al. |
| 2003/0015943 A1 | 1/2003 | Kim et al. |
| 2003/0040335 A1 | 2/2003 | McIntosh et al. |
| 2003/0043928 A1 | 3/2003 | Ling et al. |
| 2003/0143947 A1 | 7/2003 | Lyu |
| 2003/0162498 A1 | 8/2003 | Rofheart et al. |
| 2003/0216121 A1 | 11/2003 | Yarkosky |
| 2004/0001477 A1 | 1/2004 | D'Amico et al. |
| 2004/0003804 A1 | 1/2004 | Yasui |
| 2004/0010609 A1 | 1/2004 | Vilander et al. |
| 2004/0037565 A1 | 2/2004 | Young et al. |
| 2004/0066326 A1 | 4/2004 | Knapp |
| 2004/0102195 A1 | 5/2004 | Naghian et al. |
| 2004/0198453 A1 | 10/2004 | Cutrer et al. |
| 2004/0204097 A1 | 10/2004 | Scheinert et al. |
| 2004/0219950 A1 | 11/2004 | Pallonen et al. |
| 2004/0233877 A1 | 11/2004 | Lee et al. |
| 2004/0248580 A1 | 12/2004 | Backes et al. |
| 2004/0258100 A1 | 12/2004 | Jantti et al. |
| 2005/0007993 A1 | 1/2005 | Chambers et al. |
| 2005/0143091 A1* | 6/2005 | Shapira et al. .......... 455/456.1 |
| 2005/0147067 A1 | 7/2005 | Mani et al. |
| 2005/0148368 A1 | 7/2005 | Scheinert et al. |
| 2005/0153712 A1 | 7/2005 | Osaka et al. |
| 2005/0157675 A1 | 7/2005 | Feder et al. |
| 2005/0176368 A1* | 8/2005 | Young et al. .............. 455/11.1 |
| 2005/0201323 A1 | 9/2005 | Mani et al. |
| 2005/0221817 A1 | 10/2005 | Pinola |
| 2005/0227710 A1 | 10/2005 | Yamashita |
| 2005/0233710 A1 | 10/2005 | Lakkis et al. |
| 2005/0243785 A1 | 11/2005 | Sabat, Jr. et al. |
| 2005/0250503 A1 | 11/2005 | Cutrer |
| 2006/0025072 A1 | 2/2006 | Pan |
| 2006/0025158 A1 | 2/2006 | Leblanc |
| 2006/0041680 A1* | 2/2006 | Proctor Jr., et al. .......... 709/238 |
| 2006/0072602 A1 | 4/2006 | Achanta |
| 2006/0094470 A1* | 5/2006 | Wake et al. .............. 455/562.1 |
| 2006/0121944 A1 | 6/2006 | Buscaglia et al. |
| 2006/0123053 A1 | 6/2006 | Scannell, Jr. |
| 2006/0133346 A1 | 6/2006 | Chheda et al. |
| 2006/0172710 A1 | 8/2006 | Cahana et al. |
| 2006/0193295 A1 | 8/2006 | White et al. |
| 2006/0234722 A1 | 10/2006 | Hanebeck et al. |
| 2007/0099562 A1 | 5/2007 | Karabinis et al. |
| 2008/0014948 A1 | 1/2008 | Scheinert |
| 2009/0061766 A1 | 3/2009 | Ding et al. |

FOREIGN PATENT DOCUMENTS

| | | |
|---|---|---|
| EP | 0391597 | 10/1990 |
| EP | 0664621 | 7/1995 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 2004034508 | 4/2004 |

OTHER PUBLICATIONS

"EDGE Introduction of High-Speed Data in GSM/GPSR Networks", 2003, pp. 1-16, Publisher: Ericsson AB.

"Mulitple-Input Multiple-Output Communications", "http://en.wikipedia.org/wiki/Multiple-input_multiple-ouput_communications", May 17, 2007, Publisher: Wikipedia, Published in: US.

"Products: nanGSM Picocell", "http://www.ipaccess.com/nanGSM/nanGSM.htm", Aug. 2, 2007, pp. 1-8, Publisher: ip.access.

Hewlett-Packard Development Co., L.P., "Voice Over Wireless LAN Solution Brief", "ProCurve Networking by H.P.", 2006, Publisher: Hewlett-Packard Development Co., L.P.

International searching authority, "International Search Report", Aug. 22, 2008, Published in: WO.

Wala, "A New Microcell Architecture Using Digital Optical Transport ", "Proceedings of the Vehicular Technology Conference", May 18, 1993, pp. 585-588, Publisher: IEEE, Published in: US.

Akos et al., "Direct Bandpass Sampling of Multiple Distinct RF Signals", Jul. 1, 1999, pp. 983-988, vol. 47, Publisher: IEEE Transactions on Communications.

Foxcom Wireless Proprietary Information, "Litenna In-Building RF Distribution System", 1998, pp. 1-8.

1998 Foxcom Wireless Proprietary Information, "Application Note "RFiber—RF Fiberoptic Links for Wireless Applications"", 1998, pp. 3-11, Published in: US.

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", Jun. 1991, pp. 1171-1175, Publisher: IEEE.

Nakatsugawa et al., "Software Radio Base and Personal Stations for Cellular/PCS Systems", 2000, pp. 617-621, Publisher: IEEE.

"Tektronix Synchronous Optical Network (SONET)", "http://www.iec.org/online/tutorials/sonet/topic03.html", 2002, Publisher: International Engineering Consortium.

Georges et al., "U.S. Appl. No. 08/635,368", "Distribution of Radio-Frequency Signals Through Low Bandwidth Infrastructures", Filed Apr. 19, 1996, Publisher: Abandoned, Published in: US.

Schwartz, "U.S. Appl. No. 09/560,656", "Adaptive Capacity Management in a Centralized Basestation Architecture", Filed on Apr. 27, 2000, Publisher: Abandoned, Published in: US.

Wong et al., "U.S. Appl. No. 09/561,372", "A Cellular Communications System With Centralized Capacity Resources Using DWDM Fiber Optic Backbone", Filed on Apr. 28, 2000, Publisher: Abandoned, Published in: US.

* cited by examiner

DISTRIBUTED ANTENNA COMMUNICATIONS SYSTEM AND METHODS OF IMPLEMENTING THEREOF

FIELD OF THE INVENTION

The present invention relates to the field of wireless communications and, more particularly, to a distributed antenna system for wireless communications.

BACKGROUND OF THE INVENTION

A conventional distributed antenna system (DAS) provides indoor coverage for wireless communications. Transmitted power is divided among several antennas in distributed indoor locations so as to provide a large coverage area using less transmitted power than would be required by a single antenna system. The antennas of a typical DAS are connected to a cellular base station and are used for cellular mobile communications.

A DAS can be implemented using passive or active components. A passive DAS is implemented using passive splitters and, to minimize signal degradation between the base station and antennas, large diameter coaxial cables are typically employed. Installation of a conventional passive DAS requires a planning phase that includes site surveys and system set-up by trained experts in order to ensure that the coverage area and signal strength is suitable throughout the system. Accordingly, passive DAS systems tend to be expensive to implement.

An active DAS employs active amplifiers and, in some cases, frequency converters that reduce a radio frequency (RF) signal from the base station to an intermediate frequency (IF) for communication to antenna units. At the antenna units, the IF signals are up-converted to RF again. Such active DAS implementations require only thin coaxial cable, though the performance tends to be improved over that of passive DAS implementations. So that the active DAS is able to accommodate various communication channels and frequencies used by mobile equipment and base stations, the active components need to process a wide range of frequency bands. Due to the requirement for active components that process a wide range of frequency bands, active DAS systems also tend to be expensive to implement.

Therefore, what is needed is an improved distributed antenna system. It is toward this end that the present invention is directed.

SUMMARY OF THE INVENTION

The present invention provides a distributed antenna communications system and methods of implementing a distributed antenna communications system. In accordance with an embodiment of the invention, a distributed antenna system comprises: a base station configured for communication with a telecommunications network; a multi-port repeater hub connected to the base station to receive a communications signal from the base station and to distribute the communications signal to a plurality of ports of the multi-port repeater hub, the multi-port repeater hub comprising a scanner for scanning a plurality of frequency channels to identify one or more channels of the communications signal received from the base station; and a plurality of antenna units, each coupled to one of the ports of the multi-port repeater hub.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
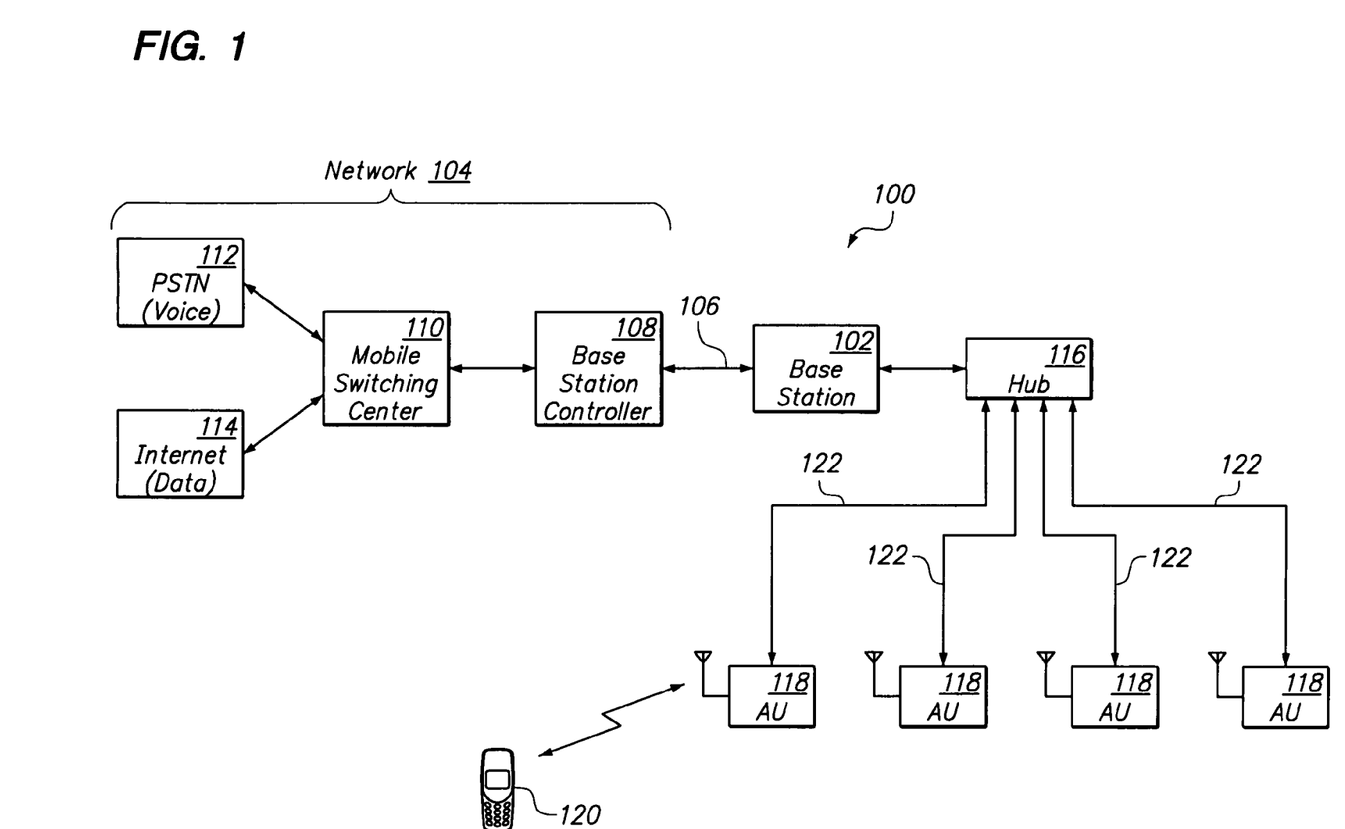
FIG. 1 illustrates a distributed antenna communications system in accordance with an embodiment of the present invention.

FIG. 1 illustrates a distributed antenna communications system 100 in accordance with an embodiment of the present invention. As shown in FIG. 1, a pico base transceiver subsystem (which may also be referred to as a BTS or base station) 102 is communicatively coupled to a communications network 104 via a backhaul link 106. Within the communications network 104, the backhaul 106 is coupled to a base station controller (BSC) 108, which is, in turn, coupled to a mobile switching center (MSC) 110. The MSC 110 is coupled to a public switched telephone network (PSTN) 112 (e.g. for voice communications) and may also be coupled the Internet 114 (e.g. for data communications).

The BSC 108 may perform various conventional functions including radio channel allocation, call handovers among base stations, configuring the base station 102, handling alarms and performing network management functions. The MSC 110 may perform various conventional functions including circuit switching, and providing applications and call features to mobile subscribers, such as call ringing and roaming. In an embodiment, certain of the features conventionally performed by the BSC 108 and MSC 110 may instead be performed by the base station 102. For example, the base station 102 may include a local server which is configured with a Linux operating system to perform these functions.

The base station 102 is also communicatively coupled to multi-port repeater hub 116 by, for example, a wireless link. The base station 102 may be located at the site of a cellular service provider. The hub 116 is communicatively coupled to a plurality of antenna units 118. Together, the antenna units form one or more coverage areas. Typically, the hub 116 and antenna units 118 are located indoors. For example, the hub 116 may be located in a utility closet of commercial building, while the antenna units 118 may be distributed throughout the building so as to form one or more coverage areas that substantially include the occupied areas within the building. The antenna units 118 are coupled to the hub 116 by links 122. In an embodiment, the links 122 comprise cabling and connectors that are commonly used for computer networking within commercial buildings, such as CAT 5 cable and RJ-45 connectors or coaxial cables (e.g., "thin" coax). As such, the hub 116 and antenna units 118 may be installed in a building using cabling that is pre-existing in the building.

Mobile communications equipment 120 (e.g., a cell phone) within a coverage area is communicatively coupled to the communications network 104 via one or more of the antenna units 118, the hub 116, the base station 102 and the backhaul 106.

The base station 102 may be a pico base station. The pico base station outputs low power (i.e. less than one watt), comprises a single transceiver unit and uses an Internet protocol (IP) backhaul connection in which voice signals are converted to IP packets for the communication via the backhaul 106. Alternatively, the pico base station may use a T1 or E1 connection for the backhaul 106.

Communications via the pico base station 102 may be within a single channel of a particular communications band. For example, CDMA communications in the 1900 MHz frequency band (i.e. 1850-1910 MHz uplink and 1930-1990 MHz downlink), use 1.25 MHz channels for each of the uplink and downlink. Accordingly, the pico base station 102 may operate within a single of one of these 1.25 MHz channels for each of the uplink and downlink. As another example, the base station 102 may operate in a single 200 kHz GSM channel within the 850 MHz frequency band (i.e. 824-849 MHz uplink and 869-894 MHz downlink).

Alternatively, the base station 102 may be macro base station or a micro base station. The macro base station comprises multiple transceiver units, outputs high power (i.e. 10 watts or more) and is communicatively coupled to the communications network 104 via the backhaul 106 which includes one or more T1 connections (in the United States) or E1 connections (in Europe). Similarly to the macro base station, the micro base station comprises multiple transceiver units and is communicatively coupled to a telephone network via a backhaul connection. However, compared to the output power of a macro base station, a micro base station outputs relatively low power (i.e. 1-2 watts) to the antennas.

Multiple base stations 102 may be coupled to the multi-port repeater hub 116. For example, two or more pico base stations, each operating in a respective uplink and downlink channel, may be communicatively coupled to the hub 116. The multiple base stations 102 may also be communicatively coupled to the base station controller 108 or to one or more different base station controllers.

Figure 2:
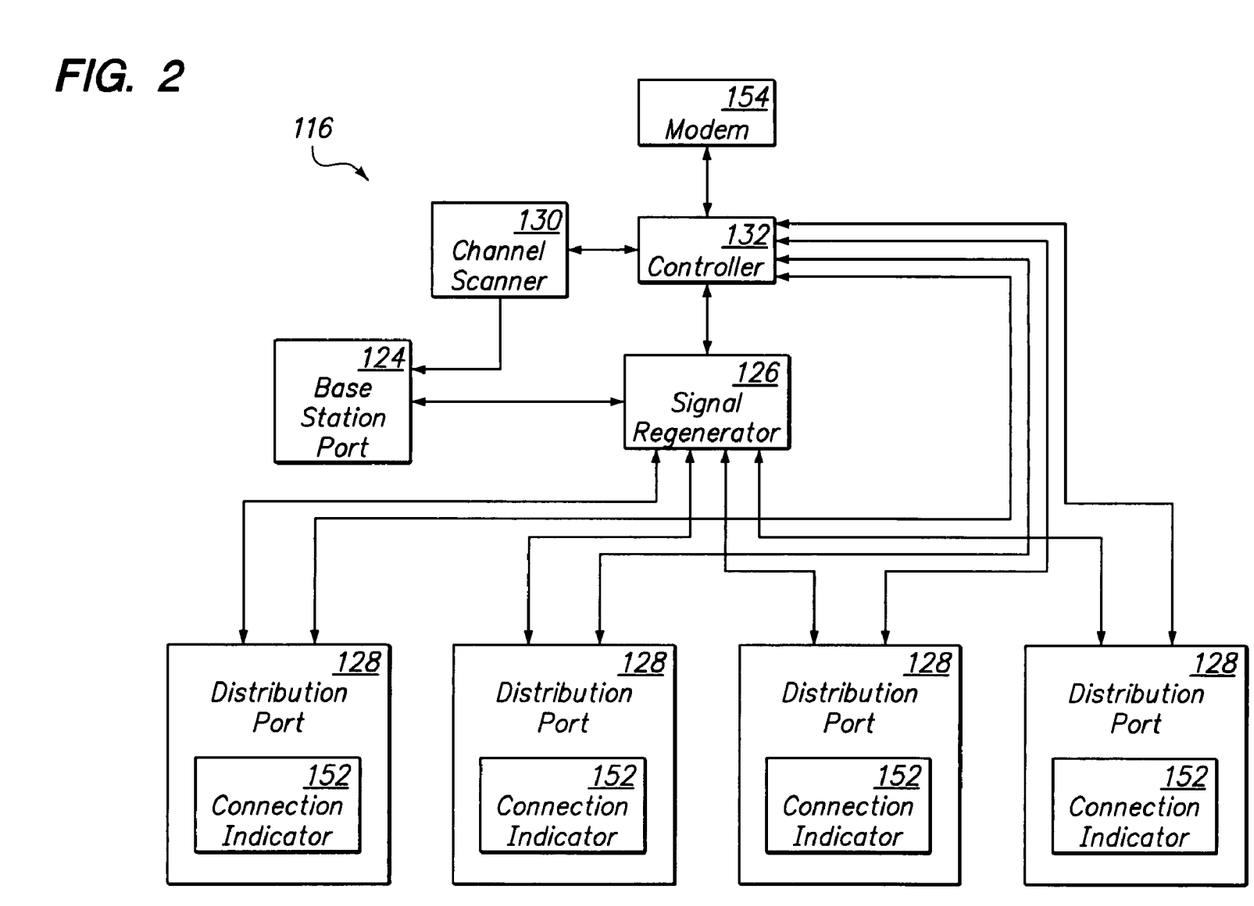
FIG. 2 illustrates a multi-port repeater hub in accordance with an embodiment of the present invention.

FIG. 2 illustrates the multi-port repeater hub 116 of FIG. 1 in accordance with an embodiment of the present invention. The hub 116 includes a base station port 124 which is configured to be communicatively coupled to the base station 102 (FIG. 1) or to multiple base stations 102, e.g., via one or more wireless links. Within the hub 116, the base station port 124 is communicatively coupled to a signal regenerator 126. The signal regenerator 126 receives downlink communications signals from the base station port 124 and distributes the signals to distribution ports 128. The signal regenerator 126 may also perform signal processing functions, such as filtering and amplifying. From the distribution ports 128, the signals are provided to the antenna units 118 (FIG. 1). Uplink signals from the antenna units 118 are received at the distribution ports 128. The signal regenerator 126 receives the uplink communication signals from the distribution ports 128 and provides them to the base station port 124. The uplink signals are received by the base station 102 from the base station port 124. If the hub 116 receives multiple signals from different base stations, these signals may be combined. For example, a combiner may be coupled to the port 124 to combine the signals prior to their being passed to other components of the hub 116.

In an embodiment, the signal regenerator 126 performs frequency conversion by converting radio frequency (RF) signals received from the base station port 124 to intermediate frequency (IF) signals which are provided to the distribution ports 128. In this case, the signal regenerator 126 also converts IF signals received from the distribution ports 128 to RF signals which are provided to the base station port 124.

In an alternative embodiment, the signal regenerator 126 converts RF signals received from the base station port to baseband signals which are then provided to the distribution ports 128. For example, the RF signals may be separated into in-phase (I) and quadrature (Q) signal components that are then digitally sampled and multiplexed for transmission at baseband to the distribution ports 128. The signal regenerator 126 may also convert baseband signals (e.g., I and Q digital signal components) received from the distribution ports 128 to RF for provision to the base station port 124. Rather than multiplexing the I and Q signals, they may be communicated separately (e.g., using separate conductors within a CAT-5 cable).

As shown in FIG. 2, the multi-port hub 116 may include a channel scanner 130 for performing channel scanning functions and a controller 132 for controlling operation of the hub 116. The scanner 130 intercepts the signal(s) received from the base station 102 at the base station port 124 in order to identify one or more active channels in which the base station 102 operates, or in the case of multiple base stations, the channels in which each of base stations operates. The scanner 130 may report its measurement results to the hub controller 132 which then configures the signal regenerator 126 to operate on the one or more identified channels. This may include setting a center frequency and bandwidth of filters, amplifiers and other signal processing elements of the signal regenerator 126 for the identified channels.

Figure 3:
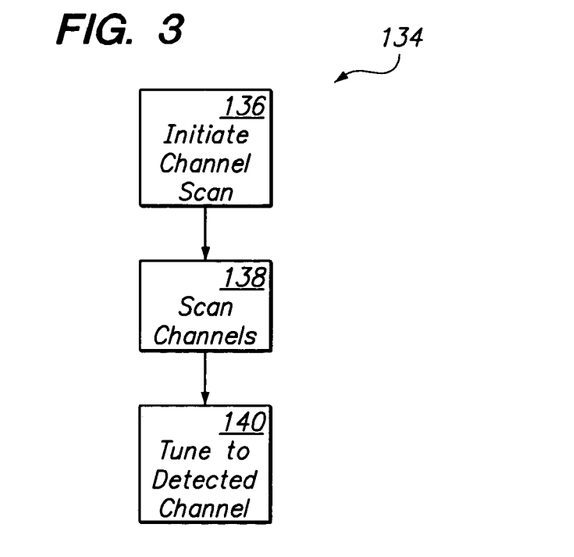
FIG. 3 illustrates a method of selecting and setting frequency bandwidth in a distributed antenna system in accordance with an embodiment of the present invention.

In an embodiment, the channel identification and configuration functions are performed by the hub 116 automatically (i.e. without user intervention) so as to facilitate implementation of the distributed antenna system 100. FIG. 3 illustrates a method 134 of selecting and setting frequency bandwidth in a distributed antenna system in accordance with an embodiment of the present invention. The hub 116 (FIG. 2) includes appropriate software and/or hardware to perform the steps of the method 134. By performing channel detection automatically, an installer does not need to manually configure the hub 116. This makes installation and implementation of the system 100 easier and tends to avoid the need for a specially-trained expert to install the system 100.

In a step 136, scanning of the channels is initiated. For example, scanning of the channels may be initiated in response to the hub 116 being connected to the base station 102, or upon the hub 116 being powered on. In addition, scanning of the channels may be initiated upon detection of a loss of the signal from the base station 102 or at periodic intervals.

In a step 138, the channels are scanned. This may be accomplished by the scanner 130 scanning across a frequency range (e.g., the 1900 MHz band) in increments that are no greater than a channel bandwidth (e.g., 200 kHz) and measuring received signal strength (i.e. RSSI) at each measurement frequency. A particular channel in which the base station 102 transmits a signal to the hub 116 can be identified since it can be expected to have a higher measured received signal strength as compared to other channels. More particularly, the frequency range of interest may be divided into a number m of intervals that are no greater than the channel bandwidth. Then, a variable n may be initialized to a value of 0, indicating the first interval. While the value of the variable n is equal to 0, the received signal strength may be measured and recorded. Then, the variable n may be incremented by one so that it is equal to 1. While the value of the variable n is equal to 1, the received signal strength may be measured and recorded. This process may then be repeated for each interval until the value of n is equal to m, which indicates that the entire frequency range of interest has been scanned.

In this manner, one or more active downlink channels are identified. In step 140, once the one or more downlink channels are identified through scanning, the signal regenerator 126 is configured to operate on these downlink channels and to operate on a corresponding uplink channel for each downlink channel. This may be accomplished by the hub controller 132 setting one or more appropriate parameters of the signal regenerator 126 which are used to tune frequency conversion and amplification circuits of the signal regenerator 126. Alternatively, rather than identifying all of the active channels before the signal regenerator 126 is configured, the signal regenerator 126 may be configured to operate on a particular channel as soon as the channel is identified and while scanning of remaining channels continues.

While multiple uplink and downlink channels may be identified, in an embodiment, the base station 102 transmits in only one uplink and one downlink channel. In this case, the single uplink and single downlink channels are identified and the regenerator 126 is appropriately configured.

In addition to setting the center frequency of an identified channel, configuring the signal regenerator 126 may also include setting the channel bandwidth. In an embodiment the channel bandwidth is fixed. For example, the bandwidth may be fixed at 5 MHz, which is sufficiently wide to accommodate the channel width for common cellular communications protocols, such as GSM (which requires a 200 kHz channel bandwidth), CDMA (which requires a 1.25 MHz channel bandwidth) and UMTS (which requires a 5 MHz channel bandwidth). Alternatively, the DAS system 100 may set the bandwidth based on the detected bandwidth and/or protocol of the signal. In this case, the scanner 130 and/or hub controller 132 may also test the received signal to identify the bandwidth of its channel(s) which may be different depending upon the protocol with which it operates. If the scanner 130 detects a GSM signal, it sets the bandwidth to 200 kHz; if it detects a CDMA signal, it sets the bandwidth to 1.25 MHz; if it detects a UMTS signal, it sets the bandwidth to 1.25 MHz, and so on. If the hub 116 receives multiple adjacent or closely-spaced channels, the bandwidth of the signal regenerator 126 may be adjusted to encompass the multiple channels. For example, if three CDMA channels of 1.25 MHz bandwidth are adjacent, the bandwidth should be set to at least 3.75 MHz so that all three channels are encompassed.

In an embodiment, the protocol is identified by determining the approximate channel width. In this case, the channel scanning is performed at intervals that are sufficiently small that the narrowest channel width of interest can be detected. For example, assume that 200 kHz, which is the channel width for GSM, is the narrowest channel width of interest. By taking received signal strength measurements at intervals of approximately 200 kHz or less, a GSM signal will result in several low value measurements, indicating inactive channels, and for an active channel, a single signal strength measurement with a higher value will be immediately preceded by a medium value signal strength measurement and immediately followed by a medium value signal strength measurement. These two medium strength adjacent measurements reflect sidebands. For a CDMA signal, several low value measurements will indicate inactive channels, and for an active channel, approximately six adjacent signal strength measurements with a higher value will be detected since the channel bandwidth is 1.25 GHz or approximately six times 200 kHz. Also, for a CDMA signal, the sidebands can be expected to be detected as two medium value signal strength measurements immediately preceding the high value measurements and two medium value signal strength measurements immediately following the high value measurements. For a UTMS signal, several low value measurements will indicate inactive channels, and for an active channel, approximately 25 adjacent signal strength measurements with a higher value will be detected since the channel bandwidth is 5.0 GHz or approximately 25 times 200 kHz. Also, for a UTMS signal, the sidebands can be expected to be detected as several medium value signal strength measurements immediately preceding the high value measurements and several medium value signal strength measurements immediately following the high value measurements. In this scheme, it may be necessary to specify whether there are multiple active channels. This is because adjacent channels of one protocol having a relatively narrow bandwidth maybe detected as a single channel of a different protocol having a wider bandwidth. In this case, user input may be accepted by the hub 116 to specify that there are multiple channels.

Figure 4:
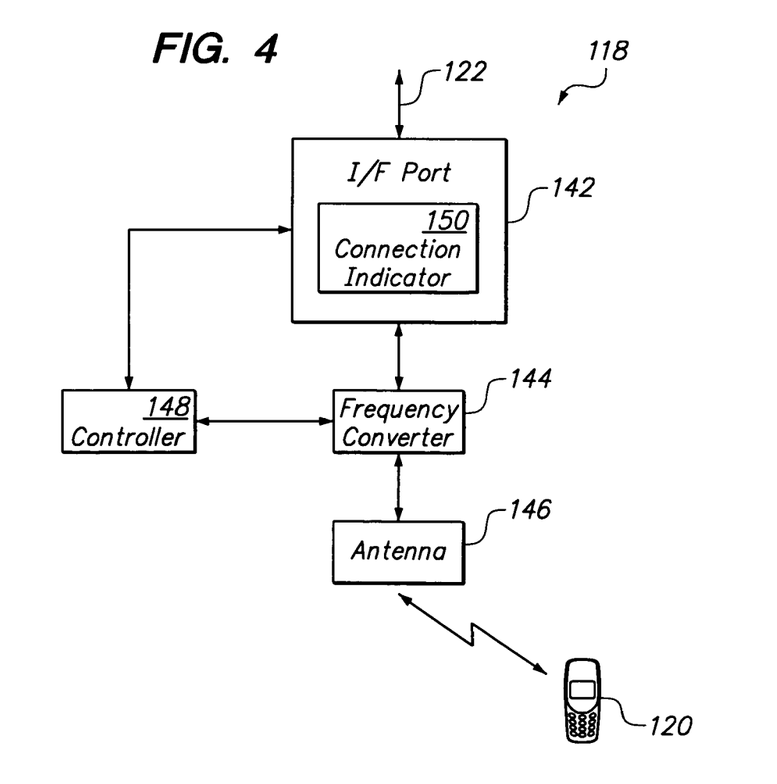
FIG. 4 illustrates an antenna unit in accordance with an embodiment of the present invention.

FIG. 4 illustrates an antenna unit 118 in accordance with an embodiment of the present invention. As shown in FIG. 4, the antenna unit 118 includes an interface port 142 which is configured to be communicatively coupled to the hub 116 (FIG. 1) via links 122 (FIG. 1). In addition, the antenna unit 118 includes a frequency converter 144, which may convert IF or baseband signals received from the hub 116 via the interface 142 into RF signals for transmission via an antenna 146 to mobile communications equipment 120. Conversely, RF signals received by the antenna 146 from mobile communications equipment 120 may be converted to IF or baseband for communication to the hub 116.

The antenna unit 118 may also include a controller 148 for controlling operation of the antenna unit 118. In an embodiment, the antenna unit controller 148 receives a message from the hub 116 which identifies the uplink and downlink channels in which the base station 102 operates. In this case, the frequency converter 144 may be configured to send signals to the antenna 146 and to receive signals from the antenna 146 using these same channels.

In an embodiment, the antenna 114 of the antenna unit 118 is integrated with a housing for the antenna unit 118 such that the antenna 114 and house are one-piece and no additional step is required to set up the antenna 114 (other than installing the antenna unit 118). This also makes installation and implementation of the system 100 easier and tends avoids the need for a specially-trained expert to install the system 100.

As mentioned, the DAS system 100 may use cabling and connectors that are commonly used for computer networking within commercial buildings, such as CAT 5 cable and RJ-45 connectors or coaxial cable. These cables typically run from a telecommunications utility room or closet to offices and other work spaces within a commercial building. These existing cables may be used as the links 122 may be used to communicatively connect the hub 116 to each of the antenna units 118. As such, the hub 116 and antenna units 118 may be installed in a building using cabling that is pre-existing in the building. This makes installation and implementation of the system 100 easier and tends to avoid the need for a specially-trained expert to install the system 100.

In an embodiment, the installer of the system 100 is provided a visual or acoustic indication of correct connections between the hub 116 and the antenna units 118. In this case, each antenna unit 118 may include a connection indicator 150 for providing an indication of a correct connection between the hub 116 and the antenna unit 118. Each antenna unit 118 may be plugged into an RJ-45 outlet which is connected to the hub 116 via a cable (e.g., a CAT 5 cable). The antenna units 118 may thus receive power from the hub 116 via the cable and outlet such that no additional power source is needed for the antenna units 118. It is known that power may be delivered using Ethernet cables in accordance with Power over Ethernet (POE) technology. When this power source is sensed by the connection indicator 150 (e.g., by sensing current or voltage), a first light emitting diode (LED) of the connection indicator 150 may be illuminated. The connection indicator 150 may also sense whether the antenna unit 118 is able to exchange communication messages with the hub 116 (e.g., the messages may be exchanged between the hub controller 132 and the antenna unit controller 148). If so, a second LED of the connection indicator 150 may be illuminated. This also makes installation and implementation of the system 100 easier and tends avoids the need for a specially-trained expert to install the system 100. Rather than illuminating the first and second LEDs, first and second acoustic tones may be emitted by the connection indicator 150 to make the corresponding indications.

The hub 116 may also include a connection indicator 152 (FIG. 2) in each of the distribution ports 128. When the connection indicator 152 senses power being drawn by the antenna unit 118, (e.g., by sensing current), a first LED of the connection indicator 152 may be illuminated. The connection indicator 152 may also sense whether the hub 116 is able to exchange communication messages with the antenna unit 118. If so, a second LED of the connection indicator 152 may be illuminated. Rather than illuminating the first and second LEDs, first and second acoustic tones may be emitted by the connection indicator 152 to make the corresponding indications.

In an embodiment, signal power at each antenna unit 118 is adjusted automatically so that signal loss between the hub 116 and each antenna units 118 is compensated independently of the amount of loss present between the hub 116 and a particular antenna unit 118. This may be accomplished for the downlink by employing automatic gain control circuitry in the antenna unit controller 148 and/or frequency converter 144 in each antenna unit 118 so that the antenna unit 118 outputs a predetermined power level to its antenna 146 regardless of the signal power received from the hub 116. For the uplink, the power level for signals sent by each antenna unit 118 to the hub 116 may be adjusted by a similar amount as is the downlink signal. This assumes that cable loss is similar in both directions between the hub 116 and each antenna unit 118. However, because the uplink and downlink channels may be at different IF frequencies, the cable loss may be different for the uplink and the downlink. Accordingly, the power level for the uplink may also be adjusted to compensate for this expected difference in the amount of loss. This automatic signal gain control also makes installation and implementation of the system 100 easier and tends avoids the need for a specially-trained expert to install the system 100.

In an embodiment, the hub controller 132 may measure round-trip signal loss between the hub 116 and each of the antenna units 118 (e.g., by activating a loop switch in each antenna unit 118). The hub controller 132 may use this information to automatically set downlink transmit levels in the hub 116. The hub controller 116 may also send a message to each antenna unit 118 which causes the antenna unit 118 to set its uplink transmit power level based on the measured round-trip signal loss. The downlink and uplink power levels between the hub 116 and each antenna unit 118 may be set independently of the others since each may experience different losses. This automatic setting of downlink and uplink power levels also makes installation and implementation of the system 100 easier and tends avoids the need for a specially-trained expert to install the system 100.

In an embodiment, the hub 116 includes a wireless modem 154. In this case, the modem may send and receive messages via the base station 102 and network 104 to and from an operating center of a network operator. For example, control messages may be received by the modem which cause the output power of the hub 116 and antenna units 118 to be set by the network operator based on round-trip signal loss measured by the hub 116 or based on other measured parameters. The network operator may also receive and respond to alarm messages that identify fault conditions in the DAS system 100.

Figure 5:
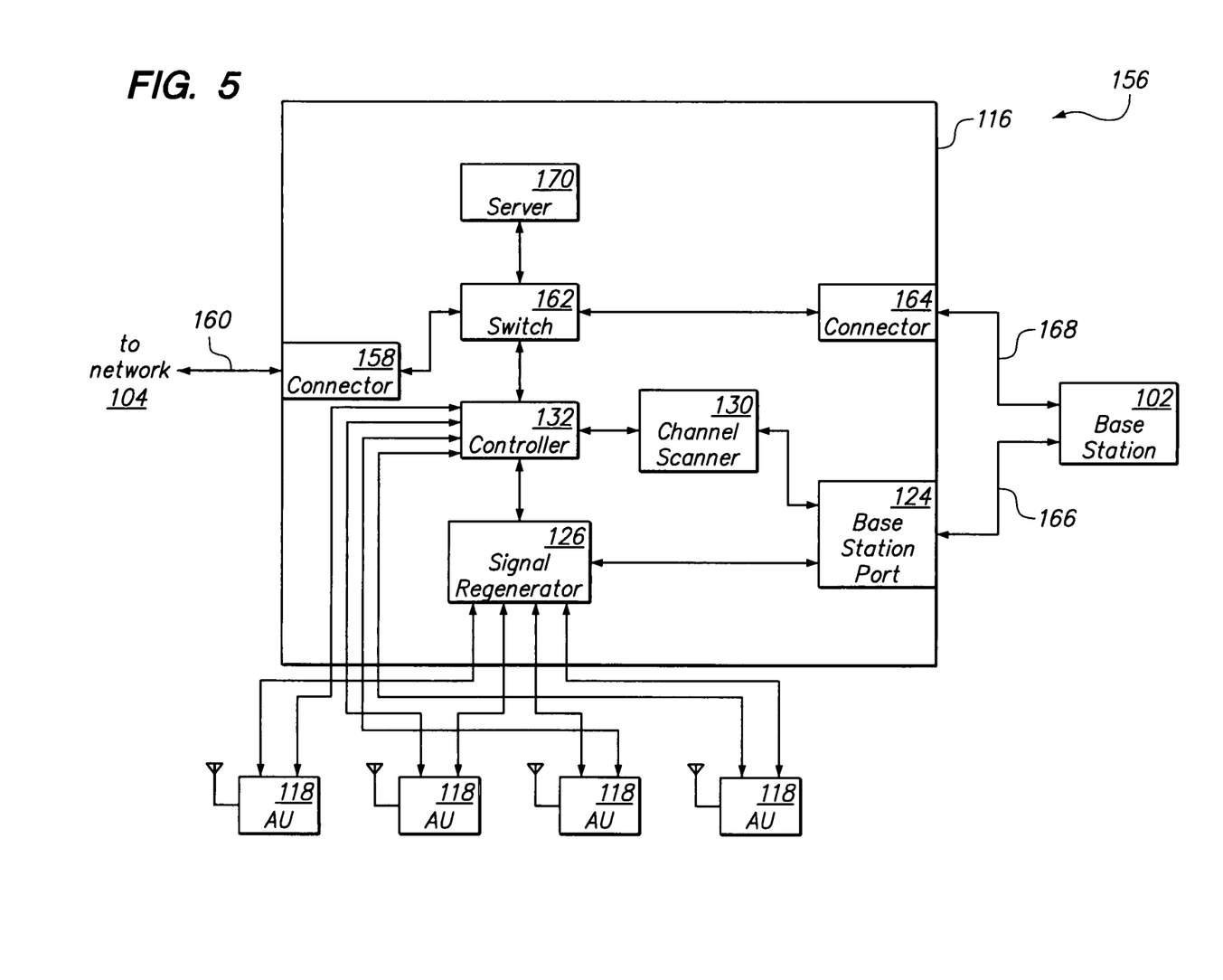
FIG. 5 illustrates a distributed antenna communications system in accordance with an alternative embodiment of the present invention.

In an alternative embodiment, the hub 116 may be communicatively coupled to the network 104 via a network connection, such as Ethernet, rather than by the modem 154 for communicating control and alarm messages between the hub 116 and the operating center of the network operator. FIG. 5 illustrates a distributed antenna communications system 156 in accordance with an alternative embodiment of the present invention. The system 156 performs the same functions as the system 100 described above with the following differences. As shown in FIG. 5, the hub 116 is communicatively coupled to the network 104 via a connector 158 and cable 160. For example, the cable 160 may be connected to a base station controller (e.g., BSC 108 of FIG. 1). Internal to the hub 116, the connector 158 may be coupled to a network switch 162, such as an Ethernet network packet switch. The switch 160 may be connected to the controller 132 and to a connector 164. The base station 102 is communicatively coupled to the hub 116 via the port 124 via a link 166. The link 166 may be a wireless link as in FIG. 1. The base station 102 may also be communicatively coupled to the hub 116 via a link 168 and the connector 164. The link 168 is a network link such as an Ethernet link.

The base station 102 is communicatively coupled to the network 104 via the hub 116 (via the cables 160 and 168 and the switch 162) rather than being directly connected to the network 104 as in FIG. 1. Accordingly, the cables 160, 168 and switch 160 serves as a backhaul for the base station 102 and hub 116. Also, communications between the controller 132 and the network 104 and between the controller 132 and the base station 102 are via the switch 162. Multiple base stations 102 may be connected to the hub 116 and, thus, multiple base stations 102 may be communicatively coupled to the network 104 via the hub 116 and switch 162. For example, a separate port of the switch 162 may be dedicated to each such base station.

FIG. 5 also shows a server 170 which may be coupled to the switch 162. The server 170 may comprise a general-purpose computer system and storage and may include an operating system such as Linux. The server 170 may provide additional functionality to the hub 116. For example, certain of the features conventionally performed by the BSC 108 and MSC 110 of the network 104 may instead be performed by the hub 116 in conjunction with the server 170.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A distributed antenna system comprising:
   a base station configured for communication with a telecommunications network;

a multi-port repeater hub connected to the base station to receive a communications signal from the base station and to distribute the communications signal to a plurality of ports of the multi-port repeater hub, the multi-port repeater hub comprising a scanner for scanning a plurality of frequency channels to identify one or more channels of the communications signal received from the base station; and a plurality of antenna units, each coupled to one of the ports of the multi-port repeater hub.

2. The distributed antenna system according to claim 1, wherein the base station comprises a single-channel pico base station.

3. The distributed antenna system according to claim 1, wherein the multi-port repeater hub comprises a signal regenerator wherein the signal regenerator is configured to perform signal processing on the one or more identified channels.

4. The distributed antenna system according to claim 3, wherein a center frequency and bandwidth of the signal regenerator is configured for each of the identified channels.

5. The distributed antenna system according to claim 4, wherein the bandwidth is fixed for all of the channels.

6. The distributed antenna system according to claim 4, wherein the bandwidth is adjusted according to a detected channel width.

7. The distributed antenna system according to claim 1, wherein the multi-port repeater hub is coupled to one or more additional base stations, each having a communications signal comprising one or more respective channels, and wherein the multi-port repeater hub identifies the one or more respective channels of each base station.

8. The distributed antenna system according to claim 1, wherein the communications signal is received by the multi-port hub at radio frequency and the antenna units receive the communications signal from the multi-port repeater hub at intermediate frequency.

9. The distributed antenna system according to claim 1, wherein the communications signal is received by the multi-port hub at radio frequency and the antenna units receive the communications signal from the multi-port repeater hub at baseband.

10. The distributed antenna system according to claim 1, wherein the multi-port repeater hub comprises a wireless modem for communicating control and alarm messages between the multi-port repeater hub and a network operator.

11. The distributed antenna system according to claim 1, wherein the multi-port repeater hub comprises a network switch wherein the base station communicates with the telecommunications network via the network switch.

12. A multi-port repeater hub for a distributed antenna system comprising:
    a base station interface port configured to communicate with a base station;
    a scanner for scanning a plurality of frequency channels to identify one or more channels of a communications signal received from the base station; and
    a plurality of distribution ports to which the communications signal received from the base station interface port is distributed, each distribution port being configured to communicate with a corresponding one of a plurality of antenna units.

13. A distributed antenna system comprising:
    a base station configured for communication with a telecommunications network;
    a multi-port repeater hub connected to the base station to receive a communications signal from the base station and to distribute the communications signal to a plurality of ports of the multi-port repeater hub, the multi-port repeater hub comprising a connection indictor for each port that indicates to a person near the multi-port repeater hub whether the port is correctly connected to its corresponding antenna; and
    a plurality of antenna units, each coupled to one of the ports of the multi-port repeater hub.

14. A distributed antenna system comprising:
    a base station configured for communication with a telecommunications network;
    a multi-port repeater hub connected to the base station to receive a communications signal from the base station and to distribute the communications signal to a plurality of ports of the multi-port repeater hub, the multi-port repeater hub comprising a connection indictor for each port that indicates to a person near the multi-port repeater hub whether the port is correctly connected to its corresponding antenna;
    a plurality of antenna units, each coupled to one of the ports of the multi-port repeater hub; and
    a plurality of cables, wherein a respective one of the cables connects each antenna unit to the corresponding port of the multi-port repeater hub and wherein each antenna unit is configured to receive power via its respective cable.

15. The distributed antenna system according to claim 14, wherein the cables comprise CAT-5 cables having RJ-45 connectors.

16. The distributed antenna system according to claim 14, wherein the connection indicator for each port of the multi-port repeater hub indicates whether the antenna unit draws power from the multi-port repeater hub.

17. The distributed antenna system according to claim 16, wherein the connection indicator for each port of the multi-port repeater hub further indicates whether the whether the multi-port repeater hub is able to exchange communication messages with its respective antenna unit.

18. The distributed antenna system according to claim 14, wherein each antenna unit indicates whether it receives power via its respective cable.

19. The distributed antenna system according to claim 18, wherein each antenna unit further indicates whether it is able to exchange communication messages with the multi-port repeater hub.

20. A multi-port repeater hub for a distributed antenna system comprising:
    a base station interface port configured to communicate with a base station;
    a plurality of distribution ports to which a communications signal received from the base station interface port is distributed, each distribution port being configured to communicate with a corresponding one of a plurality of antenna units; and
    a connection indictor for each distribution port that indicates to a person near the multi-port repeater hub whether the distribution port is correctly connected to its corresponding antenna.

21. A method for implementing a distributed antenna system comprising steps of:
    connecting a multi-port repeater hub to a base station;
    scanning a plurality of frequency channels to identify one or more channels of a communications signal received from the base station, said scanning performed automatically by the multi-port repeater hub;
    connecting each of a plurality of antenna units to a corresponding one of a plurality of distribution ports of the multi-port repeater hub; and providing an indication to a person near the multi-port repeater hub for each antenna unit as to whether the distribution port is correctly connected to its corresponding antenna unit.

22. The method according to claim 21, wherein the indication for each antenna unit is provided automatically by the multi-port repeater hub.

23. The method according to claim 21, wherein the indication for one or more of the antenna units is provided automatically by the one or more antenna units.

24. The method according to claim 21, wherein said connecting each of a plurality of antenna units to a corresponding one of a plurality of distribution ports of the multi-port repeater hub is performed using CAT-5 cables having RJ-45 connectors.

25. The method according to claim 24, wherein each antenna unit is configured to receive power via its respective cable.

26. The method according to claim 25, wherein the indication for each antenna unit indicates whether the antenna units receives power via its respective cable.

27. The method according to claim 26, wherein the indication further indicates whether the antenna unit is able to exchange messages with the multi-port repeater hub.

28. The method according to claim 21, further comprising adjusting signal power at an antenna of each antenna unit automatically.

29. The method according to claim 28, wherein signal power at each antenna is adjusted independently of signal power at the other antennas.

30. The method according to claim 21, wherein the multi-port repeater hub automatically adjusts downlink transmit power for each antenna unit.

31. The method according to claim 30, wherein the multi-port repeater hub sends a message to each antenna unit that causes the antenna unit to set its uplink transmit power.

32. The method according to claim 31, wherein downlink and uplink signal power for each antenna unit is adjusted independently of signal power at the other antenna units.

33. A distributed antenna system comprising:
- a base station configured for communication with a telecommunications network;
- a multi-port repeater hub connected to the base station to receive a communications signal from the base station and to distribute the communications signal to a plurality of ports of the multi-port repeater hub, the multi-port repeater hub comprising a network switch wherein the base station communicates with the telecommunications network via the network switch; and
- a plurality of antenna units, each coupled to one of the ports of the multi-port repeater hub.

34. The distributed antenna system according to claim 33, wherein the multi-port repeater hub is configured to communicate control and alarm messages with a network operator via the network switch.

35. The distributed antenna system according to claim 33, wherein the base station comprises a single-channel pico base station.

* * * * *